(12) United States Patent
    Zhang

(10) Patent No.: US 11,173,650 B2
(45) Date of Patent: *Nov. 16, 2021

(54) SCREEN PROTECTOR APPLICATOR

(71) Applicant: Ping Zhang, Bradfordwoods, PA (US)

(72) Inventor: Ping Zhang, Bradfordwoods, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/189,355

(22) Filed: Mar. 2, 2021

(65) Prior Publication Data

US 2021/0316497 A1    Oct. 14, 2021

Related U.S. Application Data

(63) Continuation of application No. 17/060,351, filed on Oct. 1, 2020, now Pat. No. 10,987,855.

(30) Foreign Application Priority Data

Apr. 10, 2020    (CN) .......................... 202020532210.6
Sep. 29, 2020    (CN) .......................... 202011053070.5

(51) Int. Cl.
   *B29C 63/00*    (2006.01)
   *B29C 63/02*    (2006.01)
   (Continued)

(52) U.S. Cl.
   CPC .......... *B29C 63/0004* (2013.01); *B29C 63/02* (2013.01); *G06F 1/1607* (2013.01);
   (Continued)

(58) Field of Classification Search
   CPC ..... B29C 63/02; B29C 63/0004; B29C 63/04; B29C 63/0047; B29C 63/0017; B29C 63/0095; B29C 63/0056; B29C 2063/0008; B29C 2063/027; B29C 65/7802; B29C 66/004; B29C 66/0042; B29C 66/0044; B29C 66/345; B29C 66/342; B29C 66/861; B32B 37/0076; B32B 37/30; B32B 37/003; B32B 2037/0092; B32B 2037/268; B32B 2037/109; B32B 38/10; B32B 38/105; B32B 38/1841; B32B 43/006; B32B 3/08; B32B 3/10; B32B 7/05; B32B 7/06;
   (Continued)

(56) References Cited

U.S. PATENT DOCUMENTS

| | | | |
|---|---|---|---|
| 10,987,855 B1 * | 4/2021 | Zhang ................... | B32B 27/302 |
| 2015/0291854 A1 * | 10/2015 | Colby ................... | G06F 1/1656 |
| | | | 156/249 |
| 2017/0297268 A1 * | 10/2017 | Witham ................. | B29C 65/48 |

* cited by examiner

*Primary Examiner* — John L Goff, II
(74) *Attorney, Agent, or Firm* — Ipro, PLLC

(57) ABSTRACT

Disclosed herein is a screen protector assembly and a screen protector applicator comprising a screen protector assembly and an applicator tray, the screen protector assembly comprising a cover layer, a screen protector layer and a retention layer, wherein: the cover layer is bonded on a first side of the screen protector layer by a first glue layer provided on the screen protector layer; the retention layer is bonded on a second side of the screen protector by a second glue layer provided on the retention layer; and an interlayer is provided between the retention layer and the screen protector layer. The screen protector applicator has a simple structure, and can store and protect the screen protector assembly before application of the screen protector layer to the screen. In the process of screen protector application, the operation method is simple and convenient.

25 Claims, 12 Drawing Sheets

(51) Int. Cl.
*G06F 1/16* (2006.01)
*B29L 31/34* (2006.01)
*B32B 7/06* (2019.01)

(52) U.S. Cl.
CPC ............... *B29C 2063/0008* (2013.01); *B29L 2031/3437* (2013.01); *B29L 2031/3475* (2013.01); *B32B 7/06* (2013.01)

(58) Field of Classification Search
CPC ....... B32B 17/00; B32B 17/064; B32B 17/10; B32B 3/085; B32B 7/12; B32B 2307/412; B32B 2307/748; B32B 2457/20; B32B 2457/208; Y10T 156/16; Y10T 428/14; Y10T 428/1471; Y10T 428/1476; Y10T 428/24777; Y10T 428/24942; Y10T 428/28; G06F 1/16; G06F 1/1607; G06F 1/1626; G06F 1/1656; B29L 2031/3475; B29L 2031/3437
See application file for complete search history.

SCREEN PROTECTOR APPLICATOR

TECHNICAL FIELD

The present disclosure belongs to the field of device accessories, and particularly relates to a screen protector applicator.

BACKGROUND

A screen protector, also known as a screen protective component, is a cold mounting film, sheet or the like that can be used for mounting on a surface or screen of an electronic device such as a cell phone (mobile phone), a DVD player, a laptop, a camera, a game console or a printer, or other tangible objects. With the popularization of large-screen electronic devices such as MP5 and PSP machines, people often have to apply screen protectors onto the screens of these devices in order to protect the screens from being worn. The traditional method for applying the screen protector is to apply a screen protector on a screen of a device after manual visual alignment. For this manual application method, it is very easy to apply the screen protector with a deviation, resulting in misalignment of the screen with the screen protector. It is often necessary to repeatedly apply the screen protector several times so that it is correctly applied onto the screen, which is easy to cause generation of bubbles. Once the bubbles are generated or dust is adhered, the screen protector needs to be re-applied, affecting efficiency and even causing waste of materials. Therefore, there is a need for a tool that can simplify the operation of applying the screen protector, namely, a screen protector applicator, which can help ordinary people without screen protector application skills to apply the screen protector well. It will greatly facilitate people's lives and can increase the success rate of screen protector application.

Chinese Patent Application Publication No. CN207156455U discloses a film applicator for applying a film on a surface of an electronic product such as a cell phone. The film applicator comprises a rectangular frame that encloses a hollow portion to place an electronic product onto which the film is to be applied. The rectangular frame is connected by two side frames, an upper frame and a lower frame to form an overall frame structure. A positioning flange is formed above the middle portion of the side frame and extends from a top end of the upper frame toward the hollow portion, and the positioning flange is not formed below the middle portion of the side frame. An inclined portion extends from the middle portion of the side frame to a lower portion thereof, and the height of the lower frame is lower than the height of the upper frame. The film applicator is simple in shape and convenient to use, and is advantageous to improve the accuracy and efficiency of cell phone film application. However, the film applicator cannot temporarily store and protect the cell phone protector.

SUMMARY

In order to solve the above problems, an objective of the present disclosure is to provide a screen protector applicator for applying a screen protector onto a screen of a device. It has a simple structure, and can store and protect the screen protector layer before application of the screen protector layer to the screen. In the process of screen protector application, the operation method is simple and convenient.

Another objective of the present disclosure is to provide a screen protector applicator. The screen protector applicator can avoid a screen protector layer from being bonded to a screen of a device without being operated, and can realize the automatic alignment of the screen and the screen protector layer in the process of screen protector application. It realizes slow air exclusion in the process of bonding the screen protector layer to the screen, which reduces the possibility of generating bubbles. Moreover, after the screen protector application is completed, it is easier to remove an applicator tray and a retention layer still bonded in the applicator tray from the device.

In order to achieve the above objectives, the technical solutions of the present disclosure are as follows:

A screen protector assembly, comprising a cover layer, a screen protector layer and a retention layer, wherein: the cover layer is bonded on a first side of the screen protector layer by a first glue layer provided on the screen protector layer to provide protection for the first glue layer; the retention layer is bonded on a second side of the screen protector by a second glue layer provided on the retention layer to provide retention for the screen protector layer to an external device, and the second side is opposite to the first side; and an interlayer is provided between the retention layer and the screen protector layer for reducing strength of bonding between the retention layer and the screen protector layer.

In an embodiment of the present disclosure, the retention layer is made of a material more bendable than a material of the screen protector layer.

In an embodiment of the present disclosure, the interlayer is positioned on one or more of four corners or edges of the retention layer.

In an embodiment of the present disclosure, the interlayer is positioned on four corners of the retention layer.

In an embodiment of the present disclosure, the interlayer is a plastic sheet.

In an embodiment of the present disclosure, the retention layer has one or more cutouts for facilitating release of the screen protector layer from the retention layer.

In an embodiment of the present disclosure, strength of bonding between the first glue layer and a surface to which the screen protector assembly is to be applied is greater than strength of bonding between the screen protector layer and the second glue layer.

In an embodiment of the present disclosure, a third glue layer is provided on a side of the retention layer opposite from the screen protector layer so as to bond the screen protector assembly to the external device.

In an embodiment of the present disclosure, the third glue layer is positioned on one or more of four corners or edges of the retention layer.

In an embodiment of the present disclosure, a position of the third glue layer on the retention layer corresponds to a position of the interlayer on the retention layer.

In an embodiment of the present disclosure, the cover layer is provided with an auxiliary strip having a first part and a second part, wherein the first part is attached on the cover layer and the second part is to facilitate peeling of the cover layer off from the screen protector layer by a hand of a user.

In an embodiment of the present disclosure, the screen protector layer is made of tempered glass.

In an embodiment of the present disclosure, the retention layer is made of plastic.

A screen protector applicator, comprising: the screen protector assembly described above, and an applicator tray having a base with a device side and an opposing side, walls provided at four edges of the base and a positioning ridge provided on the device side of the base and along an interior side of the wall, wherein: the retention layer of the screen protector assembly is bonded to the base of the applicator tray; the base and the positioning ridge form a first space in which the screen protector assembly is accommodated; a height of the walls is greater than a height of the positioning ridge, and the walls higher than the positioning ridge form a second space above the first space, wherein the second space is capable of accommodating a device laying horizontally, and when the device is accommodated in the second space, a surface of the device is in contact with the positioning ridge; the base has an opening for a user to access and apply force to the screen protector assembly from the opposing side of the base; and when the user places the screen protector applicator onto the screen to which the screen protector layer is to be applied, and applies force to a back of the screen protector layer through the opening at the base, a part of the screen protector layer is detached from the retention layer through its making contact to the screen and the whole screen protector layer is bonded to the screen, whereas the retention layer is still bonded to the base.

In an embodiment of the present disclosure, the screen protector assembly is tilted with respect to the screen to which the screen protector layer is to be applied when the user places the screen protector applicator onto the screen.

In an embodiment of the present disclosure, the applicator tray comprises, on the device side of the base, a first set of limiting protrusions provided on a first end of the base and a second set of limiting protrusions provided on a second end of the base, wherein the first end and the second end are in a longitudinal direction of the base, and the second end is opposite to the first end; wherein the first set of the limiting protrusions have the same height, and the second set of limiting protrusions have the same height; wherein a height of first set of limiting protrusions is greater than a height of the second set of limiting protrusions, and a sum of a height of any one of the first set or second set of limiting protrusions and a thickness of the screen protector assembly is smaller than a height of the positioning ridge; wherein when the screen protector assembly is accommodated in the first space, one end of the screen protector assembly is in contact with the first set of the limiting protrusions, and the other end of the screen protector assembly is in contact with the second set of the limiting protrusions.

In an embodiment of the present disclosure, the first set or second set of limiting protrusions each has one or more limiting protrusions.

In an embodiment of the present disclosure, the opening is a U-shaped opening provided on the second end of the base, and a size of the U-shaped opening allows a finger to access the screen protector assembly.

In an embodiment of the present disclosure, the retention layer is provided with one or more cutouts for facilitating release of the screen protector layer from the retention layer.

In an embodiment of the present disclosure, the interlayer is positioned on four corners of the retention layer.

In an embodiment of the present disclosure, the screen protector applicator further comprises an auxiliary strip having a first part and a second part, wherein the first part is attached on the cover layer and the second part is to facilitate peeling of the cover layer off from the screen protector layer by a hand of the user.

In an embodiment of the present disclosure, a thickness of the screen protector assembly is smaller than the height of the positioning ridge, so that prior to the application, when the screen protector applicator is aligned and placed onto the screen, there is a gap or distance between the screen protector layer and the screen which the screen protector layer is to be applied to.

In an embodiment of the present disclosure, a placement step is formed on an exterior periphery side of the applicator tray for allowing easy stacking of two or more screen protector applicators.

In an embodiment of the present disclosure, the screen protector applicator further comprises a hand-held portion fixed on the wall.

The advantages of the present disclosure are as follows:

Compared with the prior art, the screen protector applicator of the present disclosure a simple structure, and can store and protect the screen protector layer before application of the screen protector layer to the screen. In the process of screen protector application, the operation method is simple and convenient.

The screen protector applicator can avoid the screen protector layer from being bonded to the device screen without being operated, and can realize the automatic alignment of the screen and the screen protector layer in the process of screen protector application. It realizes slow air exclusion in the process of bonding the screen protector layer to the screen, thereby reducing the possibility of generating bubbles. Since the interlayer is provided between the retention layer and the screen protector layer, there will be a slight gap or distance at an edge joint of the retention layer and the screen protector layer in the screen protector application process, so that it is also easier to separate the retention layer from the screen protector layer.

DETAILED DESCRIPTION

In order to make the objectives, technical solutions and advantages of the present disclosure clearer, the present disclosure will be further described in detail below in conjunction with the drawings and embodiments. It should be understood that specific embodiments described herein are only used to explain the present disclosure and are not intended to limit the present disclosure.

In the present disclosure, the singular forms "a," "an," and "the" include plural forms unless the context clearly dictates otherwise.

The present disclosure is to provide a screen protector applicator for applying a screen protector onto a screen of a device. The device may be a cell phone, a smart watch, a PDA, a portable media player, a game console or a tablet device. An example where the screen protector applicator is used to apply the screen protector onto a screen of a cell phone will be described below in detail. However, it should be understood by those skilled in the art that the technical solution of the present disclosure can also be used to protect other devices in a similar way.

First Embodiment

Figure 1:
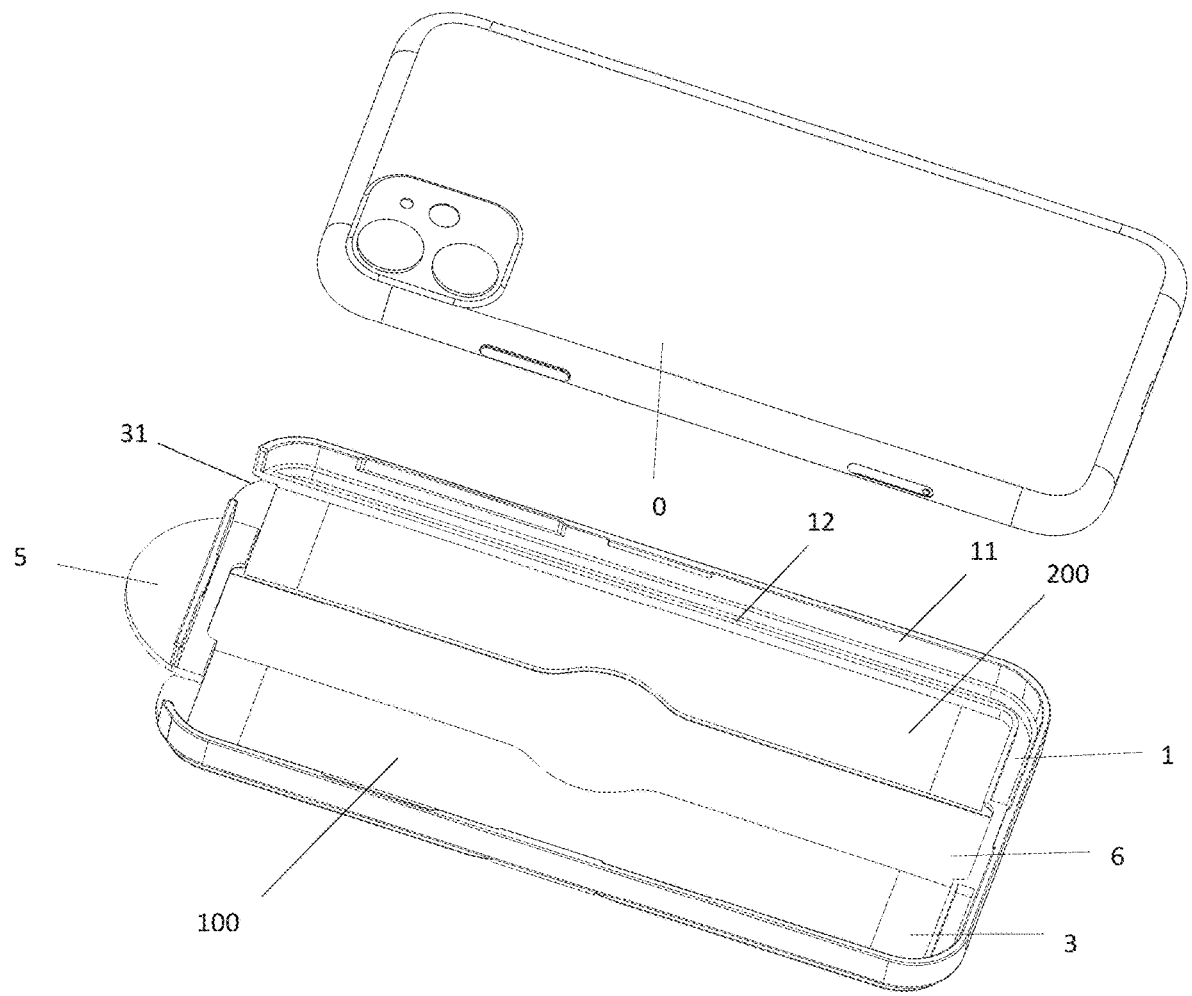
FIG. 1 is a schematic view of an exploded structure at a first angle of a screen protector applicator according to a first embodiment of the present disclosure.

A screen protector applicator according to the first embodiment of the present disclosure is as shown in FIGS. 1 to 7D. The scree protection applicator comprises an applicator tray 1, and a screen protector assembly 2. The applicator tray 1 has a base 3 with a device side and an opposing side, walls 11 at four edges of the base 3, and a positioning ridge 12 on the device side of the base 1 and along an interior side of the wall 11. A height of the wall 11 is higher than a height of the positioning ridge 12. In this embodiment, the base 3 has a shape similar to a cell phone 0, that is, it has two longer edges and two shorter edges, as shown in FIG. 1. The positioning ridge 12 is provided along all of the interior side of two walls corresponding to the longer edges and one wall corresponding to the shorter edge. Alternatively, the positioning ridge 12 may be provided along all or part of the interior side of one or more of the four walls 11.

The base 3 and the positioning ridge 12 form a first space 100, and the walls 11 higher than the positioning ridge 12 form a second space 200 above the first space 100. The screen protector assembly 2 is accommodated in the first space 100. The cell phone 0 lying horizontally may be accommodated in the second space 200. When a user puts the applicator tray 1 face down on top of the cell phone 0 to have the cell phone 0 partially placed in the second space 200, a screen 101 of the cell phone 0 is in contact with the positioning ridge 12. It should be noted that the height of the positioning ridge 12 of the first space 100 is slightly greater than the height of the screen protector assembly 2 so as to allow a gap or distance between the screen protector assembly 2 and the screen 101 of the cell phone 0. In this way, the screen protector assembly 2 and the screen 101 of the cell phone 0 can be aligned without contact until the screen protector assembly 2 is pressed into contact with the screen 101 of the cell phone 0.

Figure 2:
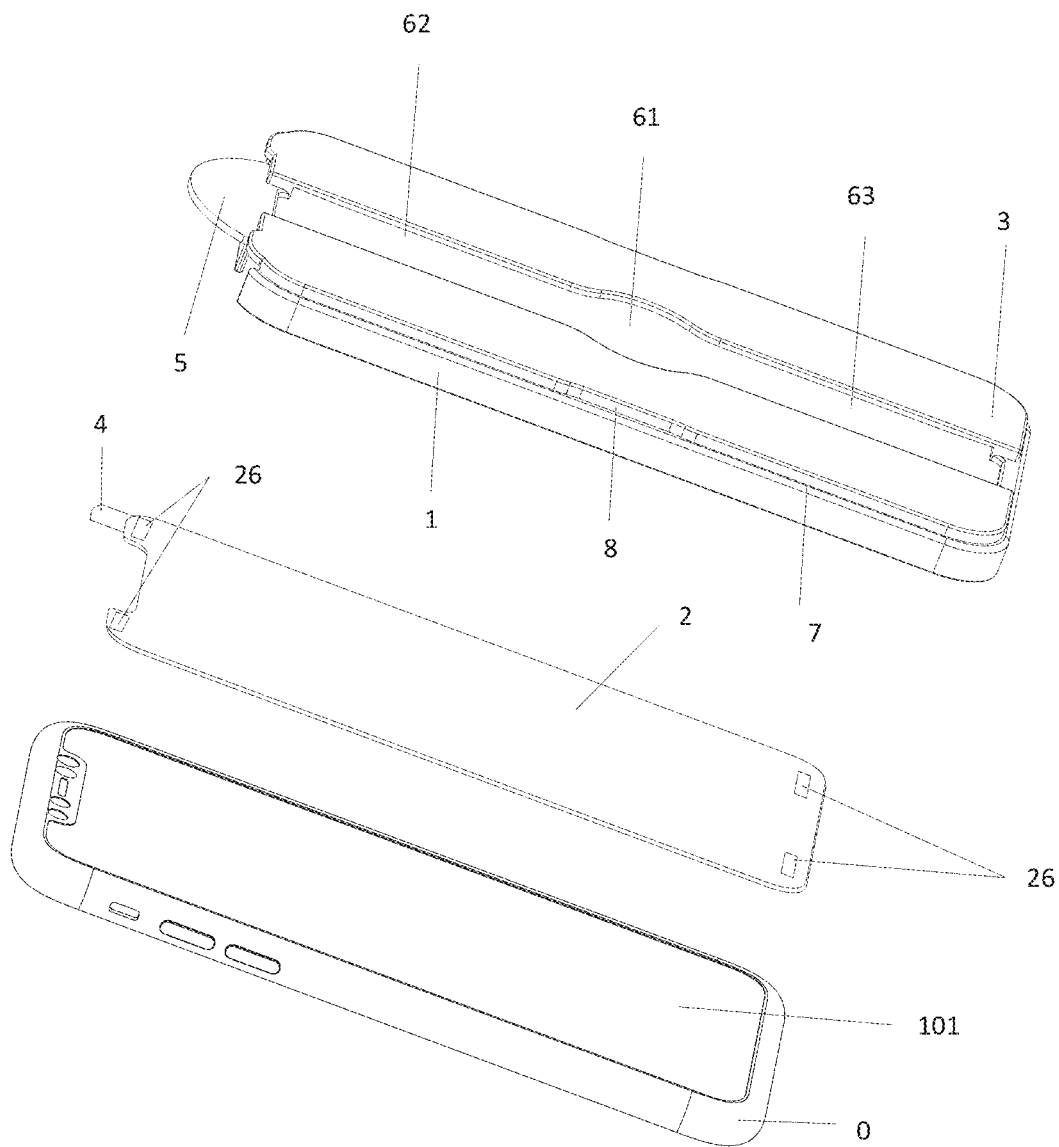
FIG. 2 is a schematic view of an exploded structure at a second angle of the screen protector applicator according to the first embodiment of the present disclosure.

An opening 6 is opened in the base 3. The opening 6 allows the user to access and apply force to a back of the screen protector assembly 2 from the opposing side of the base 3. In this embodiment, the opening 6 is an elongate opening in the middle of the base 3 and extending along a longitudinal direction of the base 3. Specifically, the opening 6 comprises a middle portion 61 for allowing a finger to access the screen protector assembly 2, a left portion 62 for allowing a finger to move toward a left side of the screen, and a right portion 63 for allowing a finger to move toward a right side of the screen. In this embodiment, the left and right portions 62 and 63 have only straight edges, whereas the middle portion 61 has curved edges. As shown in FIG. 2, the width of the middle portion 61 is larger than that of the left and right portions 62 and 63. However, the position and shape of opening 6 are not limited to these in this embodiment. In an example, the opening 6 may be shaped as an elongate opening only having straight edges, so that the middle, left and right portions 61, 62 and 63 substantially have the same width along the longitudinal direction of the opening 6. In another example, the opening 6 may be provided at a slightly off-center position of the base 3 and extend along a longitudinal direction of the base 3. In still another example, the opening 6 may be provided on the entire base 3 except for four corners. In the above examples, the width of the opening 6 must be larger than that of the finger, and in practice, its specific width is generally related to the size of the cell phone 0. For example, when the cell phone 0 has a size of about 4-6 inches, the width of the opening 6 is generally about 20-25 mm. Moreover, when the user slides his finger along the opening 6 to apply the screen protector to the screen, air possibly existing between the screen protector and the screen 101 is pushed out, thereby reducing the possibility of generating air bubbles, and increasing the adhesion of the screen protector to the screen 101.

Figure 3:
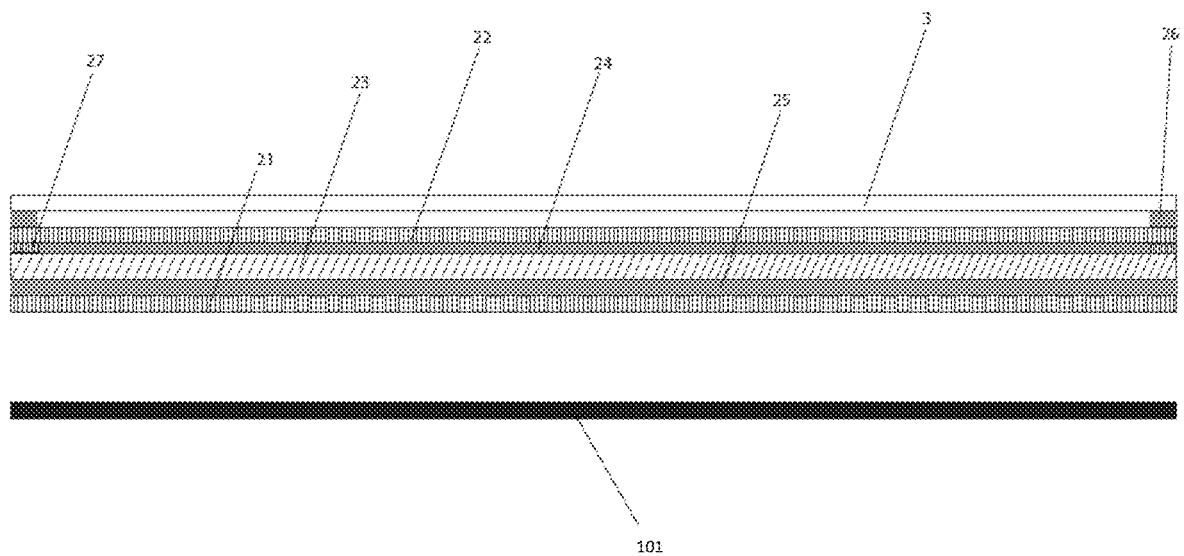
FIG. 3 is a schematic view of an exploded structure in an initial state prior to application of a screen protector layer to a device screen in the screen protector applicator according to the first embodiment of the present disclosure.
Figure 7A:
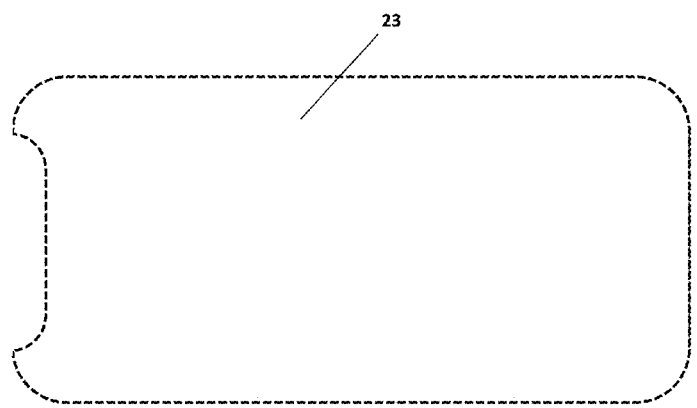
FIGS. 7A to 7D are schematic views of a screen protector assembly in the screen protector applicator according to the first embodiment of the present disclosure.

As shown in FIG. 3, in this embodiment, the screen protector assembly 2 comprises a cover layer 21, a screen protector layer 23 and a retention layer 22. The cover 21 and the retention layer 22 are bonded to both sides of the screen protector layer 23, respectively. Specifically, the cover layer 21 is bonded to a first side of the screen protector layer 23 away from the base 3 by a first glue layer 25 provided on the screen protector layer 23, and is used to provide protection for the first glue layer 25 prior to application of the screen protector layer 23 to the screen 101. The cover layer 21 needs to be detached before the application of the screen protector layer 23 to the screen 101. The retention layer 22 is bonded to a second side of the screen protector layer 23 opposite to the first side by a second glue layer 24 provided on the retention layer 22, and is bonded to the base 3 by a third glue layer 26. The retention layer 22 is used to provide retention for the screen proctor assembly 2 to the base 3 prior to the application of the screen protector layer 23 to the screen 101. The screen protector layer 23 is to be applied onto the screen 101 of the cell phone 0 so as to protect the screen 101, and can have any suitable shape and dimensions to fit a part of the screen 101 to be protected. The screen protector layer 23 shown in FIG. 7A is merely suitable for a kind of general cell phones, and a screen protector layer 23 may have any other shapes and dimensions suitable for other devices.

Figure 7B:
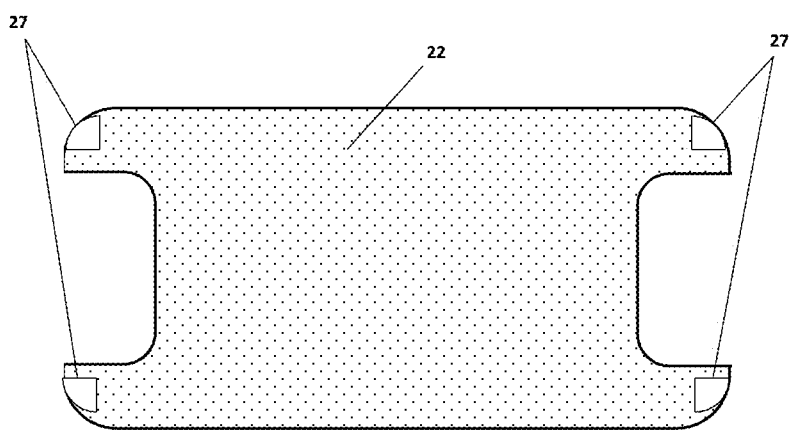
Figure 7C:
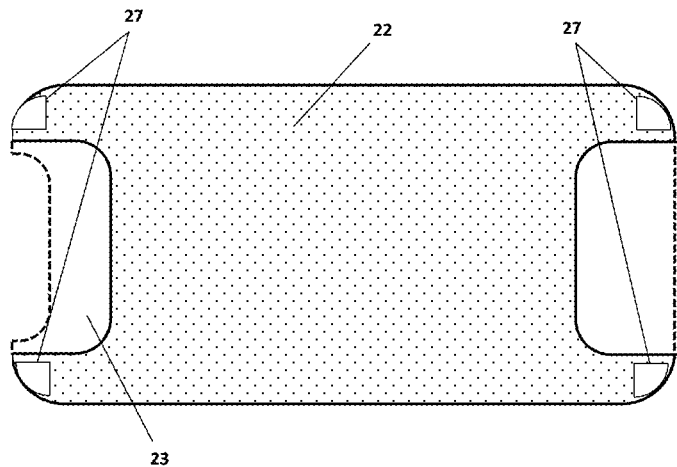
Figure 7D:
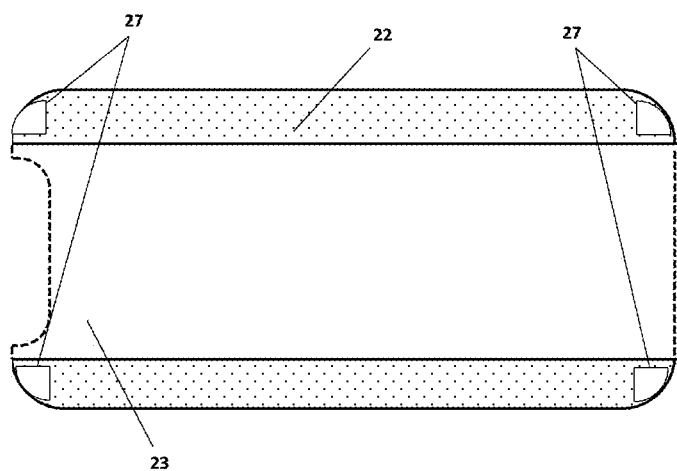
Figure 8A:
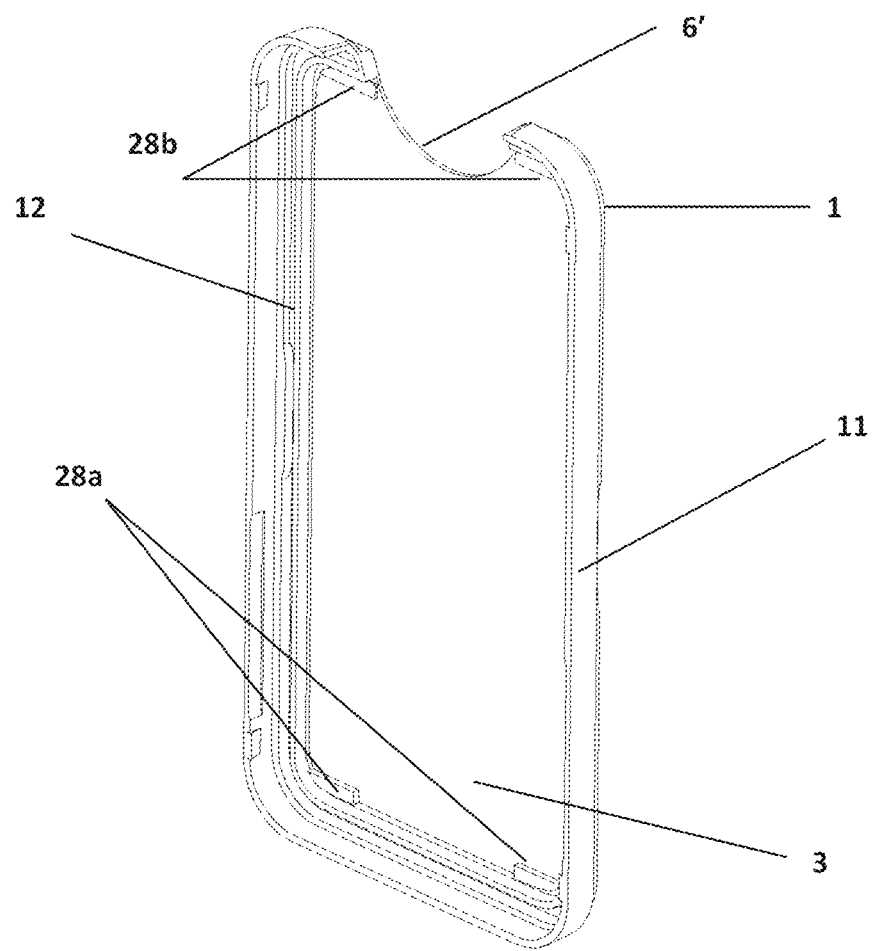
FIGS. 8A and 8B are prospective and front views of an applicator tray of a screen protector applicator according to a second embodiment of the present disclosure, respectively.
Figure 8B:
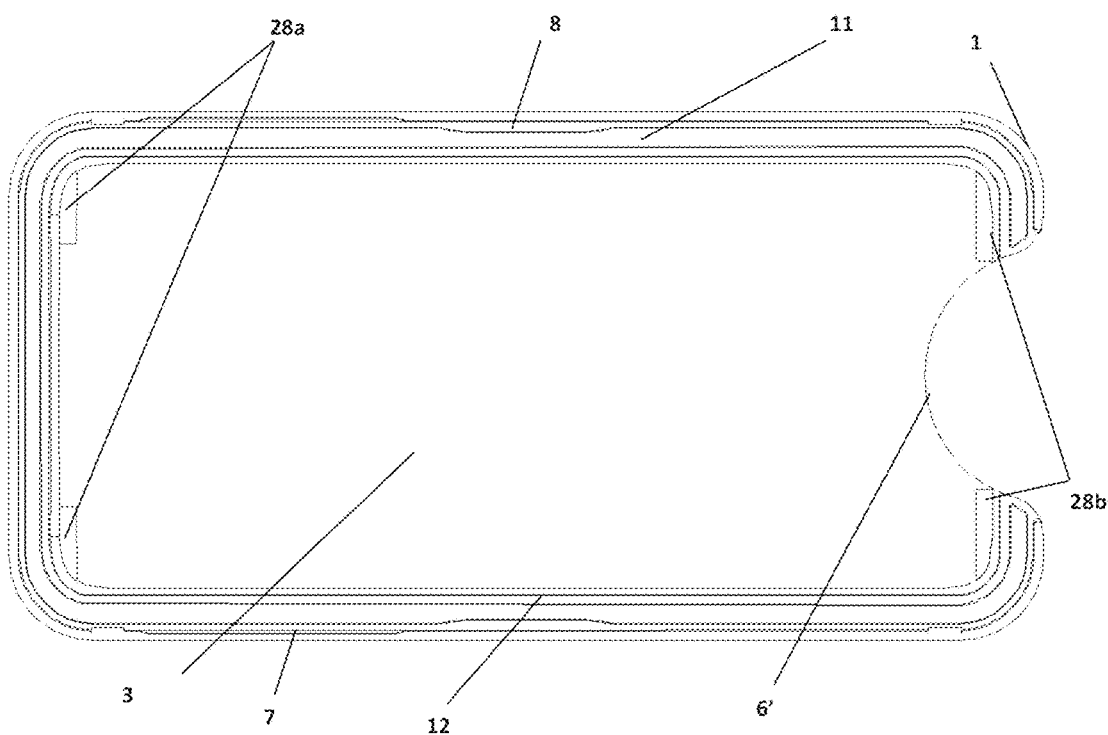

As shown in FIGS. 7B to 7C, in this embodiment, the retention layer 22 has cutouts in the middle of two ends, but still has the same outer shape as the screen protector layer 23. The retention layer 22 is easy to separate from the screen protector layer 23 at the top and bottom when the user applies force to a back of the retention layer 22 from the opening 6. It should be noted that in the present disclosure, the size of the cutout and the number of cutouts are not limited to those shown in FIGS. 7B to 7C. For example, the retention layer 22 may have only one cutout, and the one cutout may penetrate through the retention layer 22 from top to bottom, as shown in FIG. 7D.

Figure 4:
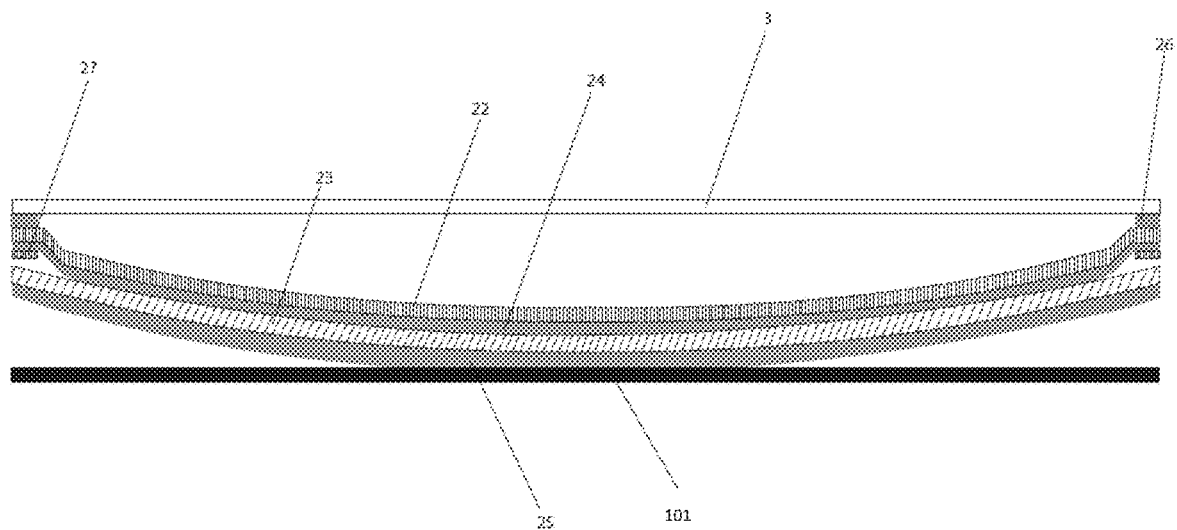
FIG. 4 is a schematic view of an exploded structure in a first use state during application of the screen protector layer to the device screen in the screen protector applicator according to the first embodiment of the present disclosure.
Figure 5:
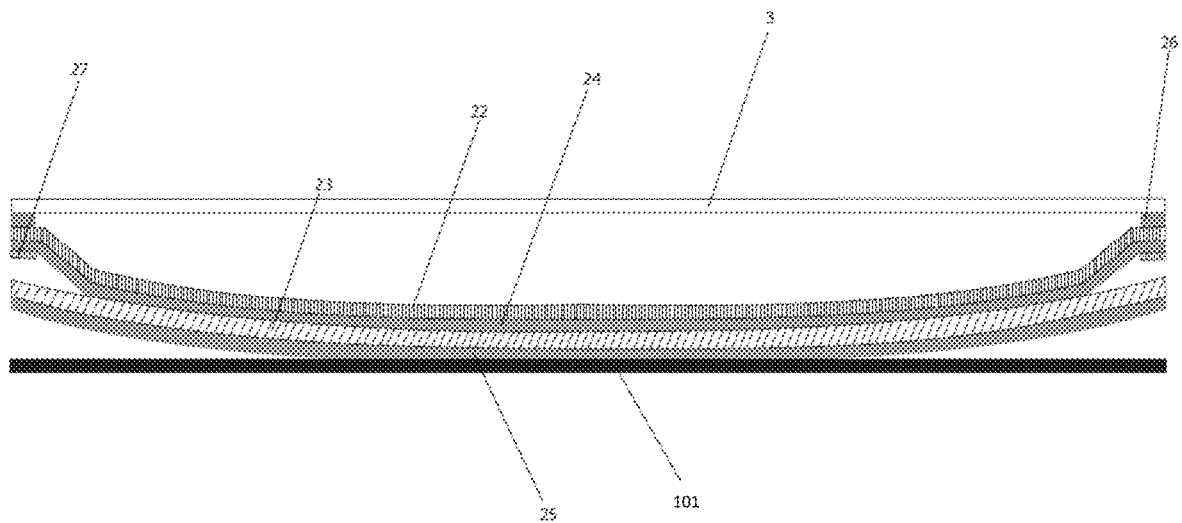
FIG. 5 is a schematic view of an exploded structure in a second use state during application of the screen protector layer to the device screen in the screen protector applicator according to the first embodiment of the present disclosure.

As shown in FIGS. 3 to 6, in this embodiment, after the user places the screen protector applicator onto the screen 101 to which the screen protector layer 23 is to be applied, when he presses the back of the screen protector assembly 2 at the middle part 61 of the opening 6 and then slides a finger left and right along the opening 6, a middle part of screen protector layer 23 first contacts the screen 101 and is bonded to it by the first glue layer 25. With sliding the finger left and right along the opening 6, under the action of pressure and adhesion, the screen protector layer 23 is released from the retention layer 22 at two ends as shown in FIG. 5, and the screen protector layer 23 gradually contact the screen 101 from the middle part to its left and right parts and are bonded to it by the first glue layer 25, until the whole screen protector layer 23 is bonded to the screen 101. It needs to be note that, in the process that the screen protector layer 23 is gradually bonded to the screen 101, the retention layer 22 is still bonded to the applicator tray 1, and the retention layer 22 is not completely separated from the screen protector layer 23, although it is deformed to some extent due to the adhesion between the screen protector layer 23 and the screen 101.

Further, in this embodiment, the strength of bonding between the base 3 and the retention layer 22 is greater than the strength of bonding between the screen protector layer 23 and the retention layer 22. Also, the strength of bonding between the screen protector layer 23 and the screen 101 is greater than the strength of bonding between the screen protector layer 23 and the retention layer 22, which is helpful to make it easier for both ends of the screen protector layer 23 to be released from the retention layer 22 in the process that the screen protector layer 23 is gradually bonded to the screen 101, as shown in FIGS. 4 and 5. However, in another example, the strength of bonding between the screen protector layer 23 and the screen 101 may also be smaller than the strength of bonding between the screen protector layer 23 and the retention layer 22. In this case, the user needs to apply larger force to press the screen protector assembly 2 and slide along the opening 6, so that the screen protector layer 23 can be released from the retention layer 22. Since the retention layer 22 is bendable, and the screen protector layer 23 is very close to the screen 101 before the screen protector application in this design, the screen protector layer 23 will be released onto the screen 101 when only two ends of the screen protector layer 23 is released from the retention layer 22. That is to say, finally, only a part of the screen protector layer 23 is released from the retention layer 22. In this embodiment, in order to further reduce the bonding strength between the retention layer 22 and the screen protector layer 23, an interlayer 27 is provided between the retention layer 22 and the screen protector layer 23. Although the interlayer 27 may be positioned on one or more of four corners of the retention layer 22, the interlayer 27 is preferably positioned on four corners of the retention layer 22, as shown in FIG. 7B to 7D. In this embodiment, the interlayer 27 is a plastic sheet. However, the interlayer 27 may also be made of any material, as long as it can facilitate easy separation of the retention layer 22 from the screen protector layer 23 during the screen protector application. When the user applied force to the back of the screen protector assembly 2 through the opening 6, since the corners of the retention layer 22 are provided with the interlayer 27, the retention layer 22 and the screen protector layer 23 can be more easily separated, making the screen protector application operation more convenient. In addition, in order to facilitate the separation of the screen protector layer 23 and the retention layer 22, an anti-finger coating (such as oleophobic) may also be applied on the screen protector layer 23.

In the present disclosure, a thickness of the screen protector assembly 2 is smaller than a height of the positioning ridge 12, so that prior to the application, when the screen protector applicator is aligned and placed onto the screen 101, there is a gap or distance between the screen protector layer 23 and the screen 101 which the screen protector layer 23 is to be applied to, thereby avoiding the screen protector assembly 2 from being attached to the screen 101 without being operated.

Further, although the applicator tray 1 is made of plastic in this embodiment, the applicator tray 1 may be made of any suitable material that can be used for molding. The material for making the applicator tray 1 should be well known to those skilled in the art, and a detailed description thereof will be omitted here. In this embodiment, the retention layer 22 can be made of a material more bendable than a material of the screen protector layer 23. For example, the screen protector layer 23 is made of tempered glass, and the retention layer 22 is made of plastic. For another example, the screen protector layer 23 is made of hard plastic, such as polyurethane, epoxy resin and silicone resin, and the retention layer 22 is made of soft plastic, such as polyethylene, polypropylene, polyvinyl chloride and styrene. However, the materials for making the screen protector layer 23 and the retention layer 22 are not limited to these examples.

In addition, it needs to be noted that the first glue layer 25 and the second glue layer 24 are made of different types of glue. Further, in this embodiment, the third glue layer 26 is made of double-sided glue. It should be noted that although the third glue layer 26 is provided on the top and the bottom of the surface of the retention layer 22 in this embodiment, it may also be provided on one or more of four corners or edges of the retention layer 22, or at any several positions around the surface of the retention layer 22, for example, on several positions at a distance (such as 1-2 mm or 3-4 mm) from the corners or edges of the retention layer 22, as long as the adhesion force provided by the third glue layer 26 is enough to bond the screen protector assembly 2 onto the base 3.

In this embodiment, as shown in FIG. 1, the wall 11 may be provided with one or more notches 31. Meanwhile, the screen protector applicator may further include an auxiliary strip 4, as shown in FIG. 2. The auxiliary strip 4 has a first part and a second part. The first part is attached on a corner of the cover layer 21, and the second part is accommodated in the notch 31, and is used to facilitate peeling of the cover layer 21 off from the screen protector layer 23 by a hand of the user.

Furthermore, the screen protector applicator may further comprise a hand-held portion 5, and the hand-held portion 5 is fixed on the wall 11. After the screen protector layer 23 is applied onto the screen 101, the retention layer 22 is still bonded to the applicator tray 1, and the retention layer 22 is not completely separated from the screen protector layer 23. In this way, the provision of the hand-held portion 5 can make it easier to remove the applicator tray 1 from the cell phone 0 and separate the retention layer 22 and the screen protector layer 23 after the screen protector application operation is completed.

Further, as shown in FIG. 2, a placement step 7 may be formed on an exterior periphery side of the applicator tray 1 for allowing easy stacking of two or more screen protector applicators. Moreover, recessed portions 8 may be provided on two side walls of the wall 11, so that the screen protector applicators can be more stably stacked and stored. It is also convenient to transport the screen protector applicators.

In addition, this embodiment further comprises a method of applying a screen protector onto a screen of a cell phone by using the screen protector applicator according to this embodiment of the present disclosure. Specific steps of the method are as follows:

Before the screen protector application, the auxiliary strip 4 is held by a user to peel off the cover layer 21 from the screen protector layer 23, and then the screen protector applicator is placed on the cell phone 0, so that the cell phone 0 is accommodated in the second space 200 inside the applicator tray 1. At this time, the cell phone screen 101 and the screen protector layer 23 are automatically aligned, but the cell phone screen 101 does not touch the first glue layer 25 and the screen protector layer 23, as shown in FIG. 3.

Figure 6:
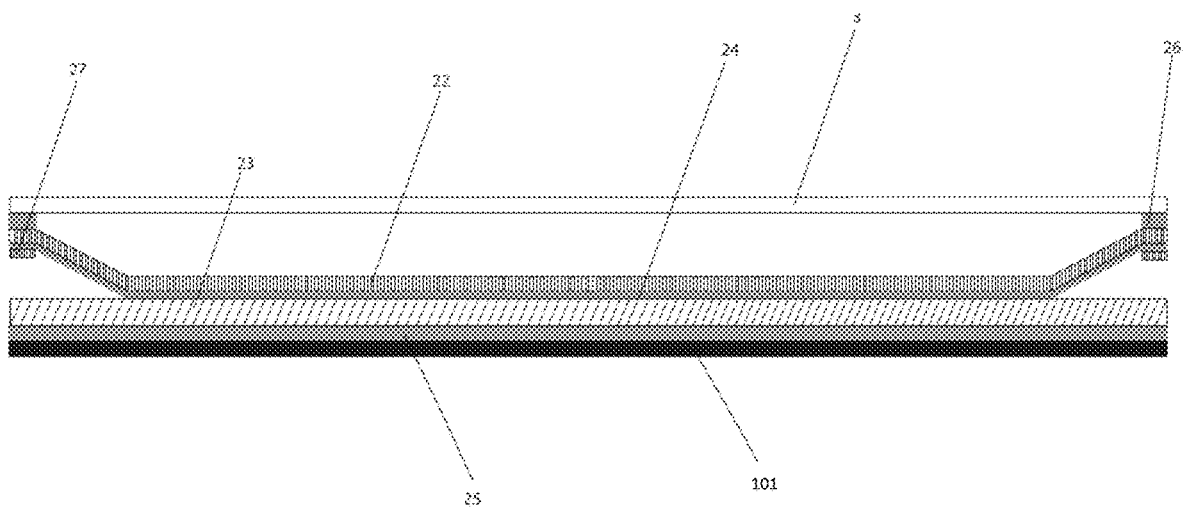
FIG. 6 is a schematic view of an exploded structure in a final state after application of the screen protector layer to the device screen in the screen protector applicator according to the first embodiment of the present disclosure.

Next, the user presses the screen protector assembly 2 on the cell phone screen 101 by pressing through the opening 61 first in the middle and then separately sliding fingers along the left opening 62 and the right opening 63. In the process of pressing the screen protector assembly 2, as shown FIGS. 4 and 5, the entire screen protector assembly 2 is deformed to some extent. At first, a middle part of screen protector layer 23 contacts the screen 101 and is bonded to it by the first glue layer 25, and at the same time, the screen protector layer 23 starts to be detached from the retention layer 22 at the top and bottom. With sliding the fingers along the left opening 62 and the right opening 63, the screen protector layer 23 further slowly contacts and is bonded to the screen 101 from the middle part to its left and right parts, until the whole screen protector layer 23 is bonded to the screen 101, as shown FIG. 6. Meanwhile, air possibly existing between the screen protector layer 23 and the screen 101 is slowly pushed out in the bonding process. Specifically, as shown in FIGS. 4-6, the air between the screen protector 23 and the screen 101 is slowly pushed from the middle part to end parts, so it can all be pushed out at once, thereby saving a subsequent operation of manually pushing out the air. It needs to be noted that, in the process that the screen protector layer 23 is gradually bonded to the screen 101, the retention layer 22 is still bonded to the applicator tray 1, and the retention layer 22 is not completely separated from the screen protector layer 23.

In addition, since the interlayer 27 is provided between the retention layer 22 and the screen protector layer 23, there will be a slight gap or distance at an edge joint of the retention layer 22 and the screen protector layer 23 in the screen protector application process, so that it is also easier to separate the retention layer 22 from the screen protector layer 23. Finally, the applicator tray 3 and the retention layer 22 still bonded in the applicator tray 3 are removed from the cell phone 0 together through the hand-held portion 5, so that the retention layer 22 and the screen protector layer 23 are completely separated to complete the screen protector application process.

Second Embodiment

A screen protector applicator according to the second embodiment of the present disclosure is as shown in FIGS. 8 to 12. The screen protection applicator comprises an applicator tray 1, and a screen protector assembly 2. Since the screen protector assembly 2 of this embodiment is substantially the same as the foregoing screen protector assembly 2 of the first embodiment, a detailed description thereof will be omitted in this embodiment.

The applicator tray 1 has a base 3 with a device side and an opposing side, walls 11 at four edges of the base 3, and a positioning ridge 12 on the device side of the base 1 and along an interior side of the wall 11. A height of the wall 11 is higher than a height of the positioning ridge 12. The base 3 has a shape similar to a cell phone 0, that is, it has two longer edges and two shorter edges, as shown in FIG. 1. The positioning ridge 12 is provided along all of the interior side of four walls. Alternatively, however, the positioning ridge 12 may be provided along all or part of the interior side of one or more of the four walls 11. Further, the applicator tray 1 has four limiting protrusions 28a, 28b on the device side of the base 3, i.e. two limiting protrusions 28a on a first end 29 and two limiting protrusions 28b on a second end 30, wherein the first end 29 and the second end 30 are in a longitudinal direction of the base 3, and the second end 30 is opposite to the first end 29; wherein the two limiting protrusions 28a on the first end 29 have a height greater than that of the two limiting protrusions 28b on the second end 30, and the two limiting protrusions 28a or 28b on the same end have the same height; and wherein a sum of a height of any one of the four limiting protrusions 28a, 28b and a thickness of the screen protector assembly 2 is smaller than a height of the positioning ridge 12. It needs to be noted that the number of limiting protrusions on the first end 29 or the second end 30 is not necessarily limited to 2, and it may also be any integer equal to or greater than 1. Specifically, there may be only one limiting protrusion on each of the first end 29 and the second end 30; or there may be only one limiting protrusion on one of the first end 29 and the second end 30, and there may be two limiting protrusions on the other of the first end 29 and the second end 30; or there may be two or more limiting protrusions on each of the first end 29 and the second end 30.

Figure 9:
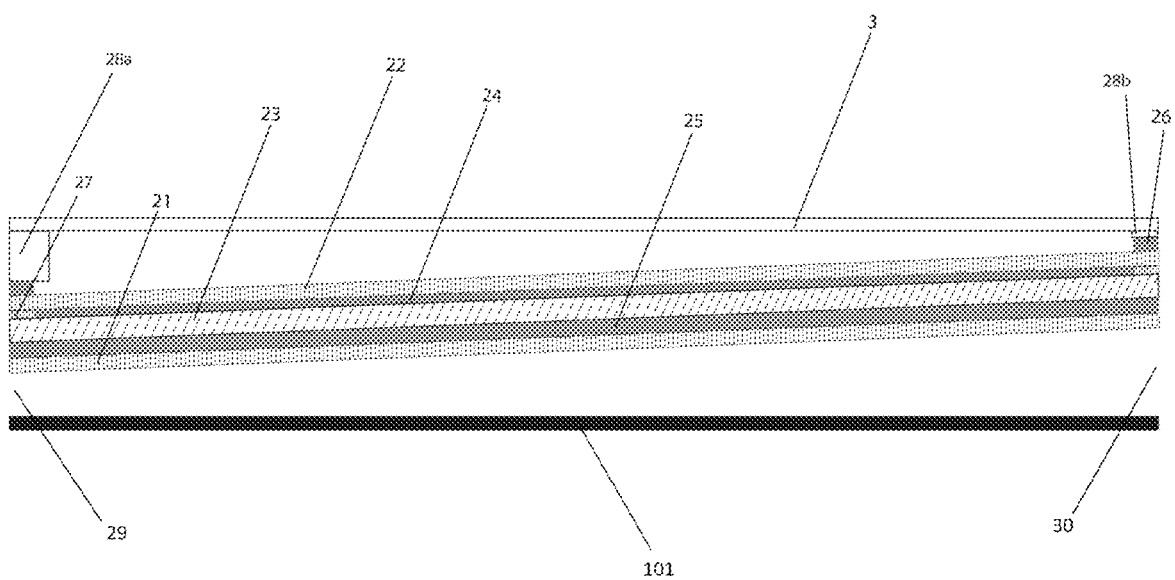
FIG. 9 is a schematic view of an exploded structure in an initial state prior to application of a screen protector layer to a device screen in the screen protector applicator according to the second embodiment of the present disclosure.

The base 3, the limiting protrusions 28a, 28b and the positioning ridge 12 form a first space. Since the sum of the height of the limiting protrusions 28a, 28b and the thickness of the screen protector assembly 2 is smaller than the height of positioning ridge 12, when the screen protector assembly 2 is accommodated in the first space, one end of the screen protector assembly 2 is in contact with the limiting protrusions 28a on the first end 29, the other end of the screen protector assembly 2 is in contact with the limiting protrusions 28b on the second end 30, and the limiting protrusions 28a, 28b, the screen protector assembly 2 and the base 3 are enclosed to form a hollow cavity, as shown in FIG. 9. Thus, the entire surface of the screen protector assembly 2 does not directly contact the base 3 as in the first embodiment. In this design, even when the base 3 is deformed due to changes in surrounding environmental factors such as temperature and humidity, the screen protector assembly 2 bonded to the base 3 will not be affected by the deformation of the base 3. Therefore, compared with the first embodiment, this embodiment is more helpful to improve the performance stability of the screen protector assembly 2. The walls 11 higher than the positioning ridge 12 form a second space above the first space. The cell phone 0 lying horizontally may be accommodated in the second space. When a user puts the applicator tray 1 face down on top of the cell phone 0 to have the cell phone 0 partially placed in the second space, a screen 101 of the cell phone 0 is in contact with the positioning ridge 12. It should be noted that the sum of the height of the limiting protrusions 28 and the thickness of the screen protector assembly 2 is smaller than the height of positioning ridge 12 so as to allow a gap or distance between the screen protector assembly 2 and the screen 101 of the cell phone 0. In this way, the screen protector assembly 2 and the screen 101 of the cell phone 0 can be aligned without contact until the screen protector assembly 2 is pressed into contact with the screen 101 of the cell phone 0. Further, since the height of the limiting protrusions 28a on the first end is different from the height of the limiting protrusions 28b on the second end, the screen protector assembly 2 is tilted with respect to the screen 101. Preferably, an inclination angle of the screen protector assembly 2 with respect to the screen 101 is in a range of 0-30 degrees. More preferably, it is in a range of 0-10 degrees.

Unlike the aforementioned first embodiment, in this embodiment, a U-shaped opening 6' is opened on the second end of the base 3. The U-shaped opening 6' is semi-circular, and has a size slightly greater than one thumb of an ordinary user. However, the U-shaped opening 6' may have any other shape and size, as long as it allows a finger to access the screen protector assembly 2.

As shown in FIGS. 9 to 12, when the user places the screen protector applicator onto the screen 101 to which the screen protector layer 23 is to be applied, and presses the back of the screen protector assembly 2 through the U-shaped opening 6', an end of the retention layer 22 corresponding to the U-shaped opening 6' is detached from the screen protector layer 23 under the action of pressure. Then, an end of the screen protector layer 23 corresponding to the U-shaped opening 6' first contacts the screen 101 and is adhered to it by the first glue layer 25. At this time, because the other end of the screen protector layer 23 is very close to the screen 101, a gap between the screen protector layer 23 and the screen 101 is small enough for the first glue layer 25 to bond the screen protector layer 23 and the screen 101 together from the end that is pressed down, i.e. the end of the screen protector layer 23 corresponding to the U-shaped opening 6'. Next, as the adhesion goes on, the entire screen protector assembly 2 is deformed to some extent, and then the other end is detached from the screen protector layer 23 under the action of adhesion. Thereafter, the screen protector layer 23 gradually contacts the screen 101 and is bonded to it from the end corresponding to the U-shaped opening 6' to the other end, until the whole screen protector layer 23 is bonded to the screen 101. It needs to be noted that, in the process that the screen protector layer 23 is gradually bonded to the screen 101, the retention layer 22 is still bonded to the applicator tray 1, and the retention layer 22 is not completely separated from the screen protector layer 23 although it is deformed to some extent due to the adhesion between the screen protector layer 23 and the screen 101.

Figure 11:
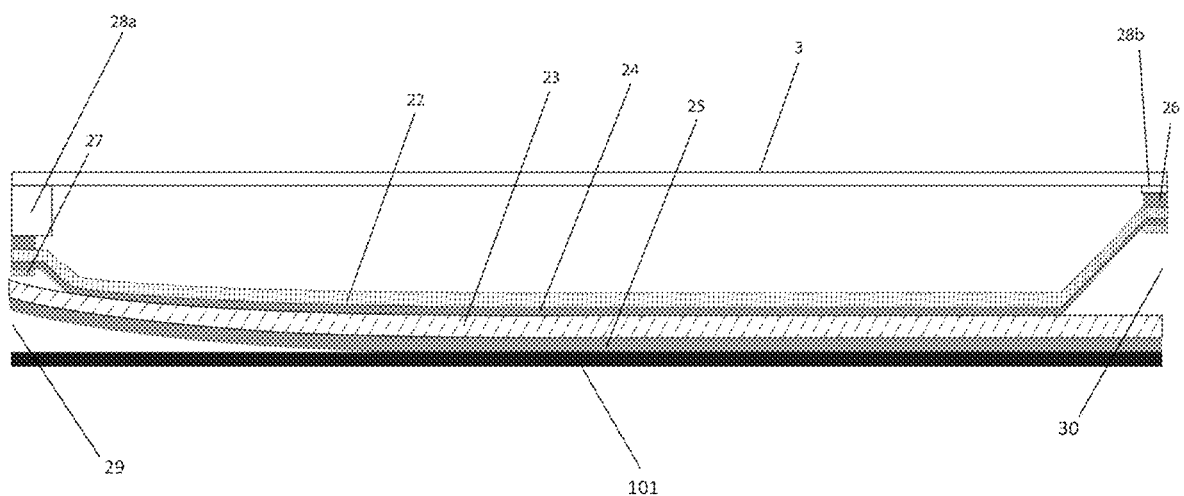
FIG. 11 is a schematic view of an exploded structure in a second use state during application of the screen protector layer to the device screen in the screen protector applicator according to the second embodiment of the present disclosure.
Figure 12:
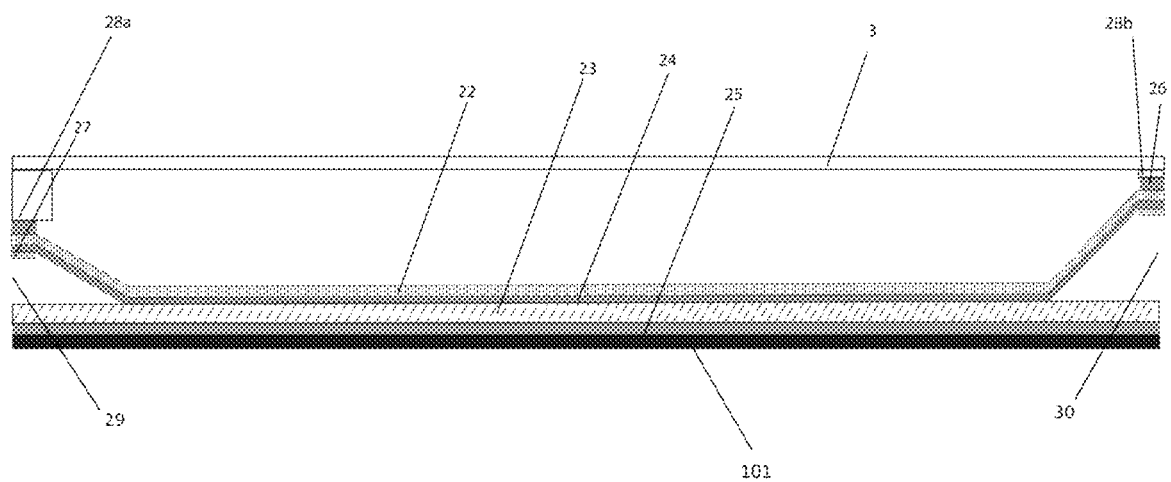
FIG. 12 is a schematic view of an exploded structure in a final state after application of the screen protector layer to the device screen in the screen protector applicator according to the second embodiment of the present disclosure.

In the process that the screen protector layer 23 is gradually bonded to the screen 101, the screen protector layer 23 is released from the retention layer 22 at its two end parts, and one end part corresponding to the U-shaped opening 6' is more released than the other end part due to the difference of the heights of the two end parts, as shown in FIGS. 11 and 12. Since the retention layer 22 is bendable, and the screen protector layer 23 is very close to the screen 101 before the screen protector application in this design, the screen protector layer 23 will be released onto the screen 101 when only two ends of the screen protector layer 23 is released from the retention layer 22. That is to say, finally, only a part of the screen protector layer 23 is released from the retention layer 22. In this embodiment, in order to further reduce the bonding strength between the retention layer 22 and the screen protector layer 23, an interlayer 27 is provided between the retention layer 22 and the screen protector layer 23. Although the interlayer 27 may be positioned on one or more of four corners of the retention layer 22, the interlayer 27 is preferably positioned on four corners of the retention layer 22. In this embodiment, the interlayer 27 is a plastic sheet. However, the interlayer 27 may be made of any material, as long as it can facilitate easy separation of the retention layer 22 from the screen protector layer 23 during the screen protector application. When the user applied force to the back of the retention layer 22 through the U-shaped opening 6', since the corners of the retention layer 22 are provided with the interlayer 27, the retention layer 22 and the screen protector layer 23 can be more easily separated, making the screen protector application operation more convenient.

In the present disclosure, the sum of the height of the limiting protrusions 28 and the thickness of the screen protector assembly 2 is smaller than a height of the positioning ridge 12, so that prior to the application, when the screen protector applicator is aligned and placed onto the screen 101, there is a gap or distance between the screen protector layer 23 and the screen 101 which the screen protector layer 23 is to be applied to, thereby avoiding the screen protector assembly 2 from being attached to the screen 101 without being operated.

Further, although the applicator tray 1 is made of plastic in this embodiment, the applicator tray 1 can be made of any suitable material that can be used for molding. The material for making the applicator tray 1 should be well known to those skilled in the art, and a detailed description thereof will be omitted here.

In this embodiment, the screen protector applicator may further include an auxiliary strip. A part of the auxiliary strip is attached on a corner of the cover layer 21, and the auxiliary strip is used to facilitate peeling of the cover layer 21 off from the screen protector layer 23 by a hand of the user.

Further, a placement step 7 may be formed on an exterior periphery side of the applicator tray 1 for allowing easy stacking of two or more screen protector applicators. Moreover, recessed portions 8 may be provided on two side walls of the wall 11, so that the screen protector applicators can be more stably stacked and stored. It is also convenient to transport the screen protector applicators.

In addition, this embodiment further provides a method of applying a screen protector onto a screen of a cell phone by using the screen protector applicator. Specific steps of the method are as follows:

Before the screen protector application, the auxiliary strip located at a position corresponding to the U-shaped opening 6' is held by a user to peel off the cover layer 21 from the screen protector layer 23, and then the screen protector applicator is placed on the cell phone 0, so that the cell phone 0 is accommodated in the second space inside the applicator tray 1. At this time, the cell phone screen 101 and the screen protector layer 23 are automatically aligned, but the cell phone screen 101 does not touch the first glue layer 25 and the screen protector layer 23, as shown in FIG. 9.

Figure 10:
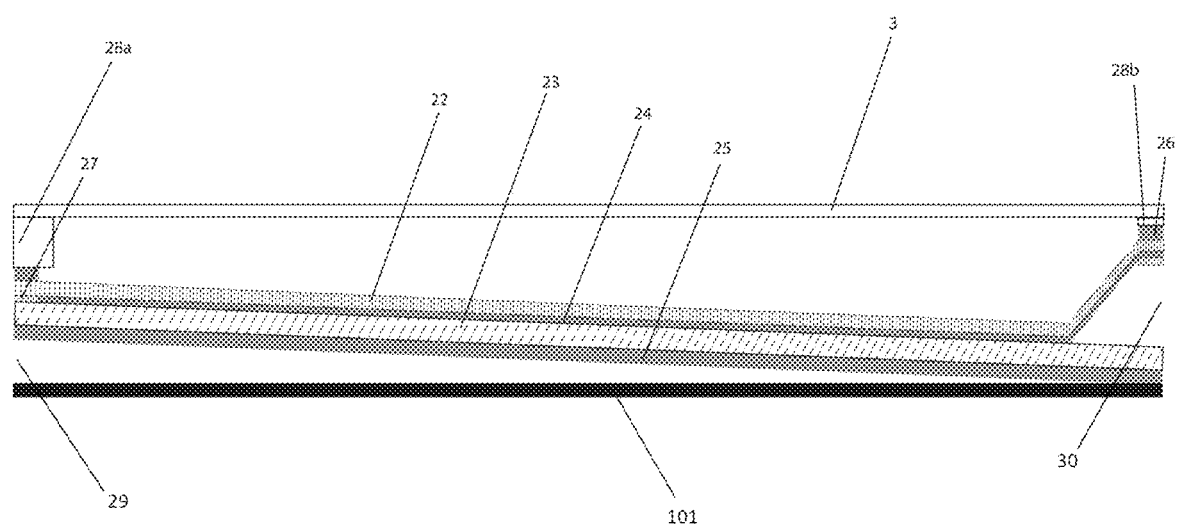
FIG. 10 is a schematic view of an exploded structure in a first use state during application of the screen protector layer to the device screen in the screen protector applicator according to the second embodiment of the present disclosure.

Next, the user presses the screen protector assembly 2 on the cell phone screen 101 through U-shaped opening 6'. In the process of pressing the screen protector assembly, an end of the retention layer 22 corresponding to the U-shaped opening 6' is detached from the screen protector layer 23 under the action of pressure. Then, an end of screen protector layer 23 corresponding to the U-shaped opening 6' first contacts the screen 101 and is adhered to it by the first glue layer 25. At this time, because the other end of the screen protector layer 23 is very close to the screen 101, a gap between the screen protector layer 23 and the screen 101 is small enough for the glue layer 25 to bond the screen protector layer 23 and the screen 101 together from the end that is pressed down, i.e. the end of the screen protector layer 23 corresponding to the U-shaped opening 6'. Next, as the adhesion goes on, the entire screen protector assembly 2 is deformed to some extent, and then the other end is detached from the screen protector layer 23 under the action of adhesion. Thereafter, the screen protector layer 23 gradually contacts the screen 101 and is bonded to it from the end corresponding to the U-shaped opening 6' to the other end, until the whole screen protector layer 23 is bonded to the screen 101. Meanwhile, air possibly existing between the screen protector layer 23 and the screen 101 is slowly pushed out in the bonding process. Specifically, as shown in FIGS. 10-12, the air between the screen protector 23 and the screen 101 is slowly pushed from the end corresponding to the U-shaped opening 6' to the other end, so it can all be pushed out at once, thereby saving a subsequent operation of manually pushing out the air. It needs to be noted that, in the process that the screen protector layer 23 is gradually bonded to the screen 101, the retention layer 22 is still bonded to the applicator tray 1, and the retention layer 22 is not completely separated from the screen protector layer 23 although it is deformed to some extent due to the adhesion between the screen protector layer 23 and the screen 101.

In addition, since the interlayer 27 is provided between the retention layer 22 and the screen protector layer 23, there will be a slight gap or distance at an edge joint of the retention layer 22 and the screen protector layer 23 in the screen protector application process, so that it is also easier to separate the retention layer 22 from the screen protector layer 23. Finally, the applicator tray 3 and the retention layer 22 still bonded in the applicator tray 3 are removed from the cell phone 0 together, so that the retention layer 22 and the screen protector layer 23 are completely separated to complete the screen protector application process.

As compared with the screen protector applicator of the first embodiment, the screen protector applicator of this embodiment is easier to operate, because it can be applied to the screen automatically by only one press at the end.

Third Embodiment

A screen protector applicator according to the third embodiment of the present disclosure is substantially the same as the foregoing screen protector assembly 2 of the second embodiment except that the applicator tray 1 with the limiting protrusions 28a, 28b on the device side in the second embodiment is replaced with an applicator tray with an inclined device side surface. When a cell phone lying horizontally is accommodated in the applicator tray with the inclined device side surface, the screen protector assembly is also tilted with respect to a screen of the cell phone as in the second embodiment. Since other structures and effects of the screen protector applicator of this embodiment are substantially the same as those in the second embodiment, a detailed description thereof will be omitted here.

The advantages of the present disclosure are as follows:

Compared with the prior art, the screen protector applicator of the present disclosure has a simple structure, and can store and protect the screen protector layer before application of the screen protector layer to the screen. In the process of screen protector application, the operation method is simple and convenient.

The screen protector applicator can avoid the screen protector layer from being bonded to the device screen without being operated, and can realize the automatic alignment of the screen and the screen protector layer in the process of screen protector application. It realizes slow air exclusion in the process of bonding the screen protector layer to the screen, thereby reducing the possibility of generating bubbles. Since the interlayer is provided between the retention layer and the screen protector layer, there will be a slight gap or distance at an edge joint of the retention layer and the screen protector layer in the screen protector application process, so that it is also easier to separate the retention layer from the screen protector layer The preferred embodiments of the present disclosure are exemplified above, and are not used to limit the present disclosure, and any modification, equivalent substitution, improvement and the like within the spirit and principle of the present disclosure should be included within the scope of protection of the present disclosure.

What is claimed is:

1. A screen protector assembly, comprising a cover layer, a screen protector layer and a retention layer;
    wherein the cover layer is bonded on a first side of the screen protector layer by a first glue layer provided on the screen protector layer to provide protection for the first glue layer;
    wherein the retention layer is bonded on a second side of the screen protector layer by a second glue layer provided on the retention layer to provide retention for the screen protector layer to an external device, and the second side is opposite to the first side;
    wherein an interlayer is provided between the retention layer and the screen protector layer for reducing strength of bonding between the retention layer and the screen protector layer;
    wherein the second glue layer directly contacts a first portion of the screen protector layer; and
    wherein the interlayer directly contacts a second portion of the screen protector layer.

2. The screen protector assembly of claim 1, wherein the retention layer is made of a material more bendable than a material of the screen protector layer.

3. The screen protector assembly of claim 1, wherein the interlayer is positioned on one or more of four corners or edges of the retention layer.

4. The screen protector assembly of claim 1, wherein the interlayer is positioned on four corners of the retention layer.

5. The screen protector assembly of claim 1, wherein the interlayer is a plastic sheet.

6. The screen protector assembly of claim 1, wherein the retention layer has one or more cutouts for facilitating release of the screen protector layer from the retention layer.

7. The screen protector assembly of claim 1, wherein strength of bonding between the first glue layer and a surface to which the screen protector assembly is to be applied is greater than strength of bonding between the screen protector layer and the second glue layer.

8. The screen protector assembly of claim 1, wherein a third glue layer is provided on a side of the retention layer opposite from the screen protector layer so as to bond the screen protector assembly to the external device.

9. The screen protector assembly of claim 8, wherein the third glue layer is positioned on one or more of four corners of the retention layer.

10. The screen protector assembly of claim 9, wherein a position of the third glue layer on the retention layer corresponds to a position of the interlayer on the retention layer.

11. The screen protector assembly of claim 10, wherein the cover layer is provided with an auxiliary strip having a first part and a second part, wherein the first part is attached on the cover layer and the second part is to facilitate peeling of the cover layer off from the screen protector layer by a hand of a user.

12. The screen protector assembly of claim 11, wherein the screen protector layer is made of tempered glass.

13. The screen protector assembly of claim 12, wherein the retention layer is made of plastic.

14. A screen protector applicator, comprising:
the screen protector assembly of claim 1, and
an applicator tray having a base with a device side and an opposing side,
walls at four edges of the base, and
a positioning ridge on the device side of the base and along an interior side of the walls;
wherein the retention layer of the screen protector assembly is bonded to the base of the applicator tray;
wherein the base and the positioning ridge form a first space in which the screen protector assembly is accommodated;
wherein a height of the walls is greater than a height of the positioning ridge, and the walls higher than the positioning ridge form a second space above the first space, wherein the second space is capable of accommodating a device laying horizontally, and when the device is accommodated in the second space, a surface of the device is in contact with the positioning ridge;
wherein the base has an opening for a user to access and apply force to the screen protector assembly from the opposing side of the base; and
wherein when the user places the screen protector applicator onto a screen to which the screen protector layer is to be applied, and applies force to a back of the screen protector layer through the opening at the base, a part of the screen protector layer is detached from the retention layer through its making contact to the screen and the whole screen protector layer is bonded to the screen, whereas the retention layer is still bonded to the base.

15. The screen protector applicator of claim 14, wherein the screen protector assembly is tilted with respect to the screen to which the screen protector layer is to be applied when the user places the screen protector applicator onto the screen.

16. The screen protector applicator of claim 15, wherein the applicator tray comprises, on the device side of the base, a first set of limiting protrusions provided on a first end of the base and a second set of limiting protrusions provided on a second end of the base, wherein the first end and the second end are in a longitudinal direction of the base, and the second end is opposite to the first end; wherein the first set of the limiting protrusions have the same height, and the second set of limiting protrusions have the same height; wherein a height of the first set of limiting protrusions is greater than a height of the second set of limiting protrusions, and a sum of a height of any one of the first set or second set of limiting protrusions and a thickness of the screen protector assembly is smaller than a height of the positioning ridge; wherein when the screen protector assembly is accommodated in the first space, one end of the screen protector assembly is in contact with the first set of the limiting protrusions, and another end of the screen protector assembly is in contact with the second set of the limiting protrusions.

17. The screen protector applicator of claim 16, wherein the opening is a U-shaped opening provided on the second end of the base, and a size of the U-shaped opening allows a finger to access the screen protector assembly.

18. The screen protector applicator of claim 14, wherein the opening is in a middle part of the base and extends along a longitudinal direction of the base.

19. The screen protector applicator of claim 18, wherein the opening comprises a middle portion for allowing a finger to access the screen protector assembly, a left portion for allowing a finger to move toward a left side of the screen, and a right portion for allowing a finger to move toward a right side of the screen.

20. The screen protector applicator of claim 14, wherein the retention layer is provided with one or more cutouts for facilitating release of the screen protector layer from the retention layer.

21. The screen protector applicator of claim 14, wherein the interlayer is positioned on four corners of the retention layer.

22. The screen protector applicator of claim 14, further comprising an auxiliary strip having a first part and a second part, wherein the first part is attached on the cover layer and the second part is to facilitate peeling of the cover layer off from the screen protector layer by a hand of the user.

23. The screen protector applicator of claim 14, wherein a thickness of the screen protector assembly is smaller than the height of the positioning ridge, so that prior to the application, when the screen protector applicator is aligned and placed onto the screen, there is a gap or distance between the screen protector layer and the screen which the screen protector layer is to be applied to.

24. The screen protector applicator of claim 14, wherein a placement step is formed on an exterior periphery side of the applicator tray for allowing easy stacking of two or more screen protector applicators.

25. The screen protector applicator of claim 14, further comprising a hand-held portion fixed on the walls.

* * * * *